United States Patent
Koerwien

(10) Patent No.: US 10,166,724 B2
(45) Date of Patent: Jan. 1, 2019

(54) METHOD FOR PROVIDING SPACERS

(71) Applicant: Airbus Defence and Space GmbH, Ottobrunn (DE)

(72) Inventor: Thomas Koerwien, Hoehenkirchen (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 524 days.

(21) Appl. No.: 14/678,189

(22) Filed: Apr. 3, 2015

(65) Prior Publication Data
US 2015/0283757 A1 Oct. 8, 2015

(30) Foreign Application Priority Data
Apr. 5, 2014 (DE) .................. 10 2014 005 146

(51) Int. Cl.
| | |
|---|---|
| *B32B 3/10* | (2006.01) |
| *B29C 65/70* | (2006.01) |
| *B29C 73/00* | (2006.01) |
| *B32B 27/08* | (2006.01) |
| *C09J 5/00* | (2006.01) |
| *B32B 7/00* | (2006.01) |
| *B32B 7/12* | (2006.01) |
| *B32B 27/00* | (2006.01) |

(Continued)

(52) U.S. Cl.
CPC .............. *B29C 65/70* (2013.01); *B29C 73/00* (2013.01); *B32B 3/00* (2013.01); *B32B 3/02* (2013.01); *B32B 3/30* (2013.01); *B32B 7/00* (2013.01); *B32B 7/12* (2013.01); *B32B 27/00* (2013.01); *B32B 27/06* (2013.01); *B32B 27/08* (2013.01); *B32B 27/304* (2013.01); *B32B 27/322* (2013.01); *C09J 5/00* (2013.01); *F16B 11/006* (2013.01); *B29K 2063/00* (2013.01); *B32B 2307/732* (2013.01); *B32B 2307/734* (2013.01); *B32B 2419/00* (2013.01); *Y10T 428/24802* (2015.01)

(58) Field of Classification Search
None
See application file for complete search history.

(56) References Cited

U.S. PATENT DOCUMENTS

| | | | |
|---|---|---|---|
| 6,692,600 B2 | 2/2004 | Veerasamy et al. | |
| 2006/0243380 A1* | 11/2006 | Boehm | B81C 3/001 156/272.8 |

FOREIGN PATENT DOCUMENTS

| | | |
|---|---|---|
| DE | 197 37 966 A1 | 8/1998 |
| DE | 102 42 895 A1 | 4/2003 |

(Continued)

OTHER PUBLICATIONS http://printwiki.org/Screen_Printing retrieved on Oct. 30, 2017.*

(Continued)

*Primary Examiner* — Christopher M Polley
(74) *Attorney, Agent, or Firm* — Crowell & Moring LLP

(57) ABSTRACT

A method for providing spacers on a construction component to be adhered involves applying a planar formation, including passages, on the construction component to be adhered, and inserting a setting liquid in the passages of the planar formation, so that the liquid forms spacer on the construction component to be adhered after setting and peeling off the planar formation. The spacer ensures a predetermined minimum bondline when adhering the construction component.

8 Claims, 2 Drawing Sheets

(51) Int. Cl.
*B32B 27/06* (2006.01)
*B32B 27/30* (2006.01)
*B32B 27/32* (2006.01)
*B32B 3/00* (2006.01)
*B32B 3/02* (2006.01)
*B32B 3/30* (2006.01)
*F16B 11/00* (2006.01)
*B29K 63/00* (2006.01)

(56) References Cited

FOREIGN PATENT DOCUMENTS

| | | |
|---|---|---|
| DE | 103 38 967 A1 | 4/2005 |
| DE | 10 2006 017 147 A1 | 10/2007 |
| DE | 10 2011 079 410 A1 | 1/2013 |
| GB | 2 264 589 A | 9/1993 |

OTHER PUBLICATIONS

European Search Report issued in counterpart European Application No. 15000946 dated Aug. 20, 2015, with Statement of Relevancy (Two (2) pages).

Russian Notice of Allowance issued in Russian counterpart application No. 2015112170/05(019048) dated Aug. 1, 2017 (Nine (9) pages).

* cited by examiner

METHOD FOR PROVIDING SPACERS

CROSS-REFERENCE TO RELATED APPLICATIONS

This application claims priority to German application 10 2014 005 146.3, filed Apr. 5, 2014, the entire disclosure of which is herein expressly incorporated by reference.

BACKGROUND AND SUMMARY OF THE INVENTION

Exemplary embodiments of the present invention relate to a method for providing spacers on a construction component to be adhered, and to a corresponding construction component. The spacers or distancing elements define a predetermined minimum bond gap thickness that must be observed even where there is local over-compression.

German patent document DE 197 37 966 A1 discloses an adhesive bond between two construction components with a curable plastic. One of the construction components comprises distancing elements that are molded or threaded on and which enter the region of an adhesive surface on the other construction component and form a bond gap having a predetermined bond gap thickness. The distancing elements are provided as studs that are arranged so as to be embodied in a punctiform manner in relation to the adhesive surface and distributed in the bond gap.

Exemplary embodiments of present invention are directed to an improved method for providing spacers on a construction component to be adhered while particularly providing the spacers with less effort.

Exemplary embodiments of the invention are directed to a method for providing spacers on a construction component to be adhered and by such a construction component.

The method for providing spacers on a construction component to be adhered comprises the following steps:
  A planar formation is placed on the construction component to be adhered. The planar formation has passages.
  A curable liquid is introduced into the passages of the planar formation so that the liquid forms spacers on the construction component to be adhered after curing and peeling off of the planar formation. The spacers ensure a predetermined bond gap thickness when the construction component is being adhered.

In other words, and as an exemplary embodiment, there are two construction components to be adhered, of which at least one is composed of a fiber composite material, wherein a predetermined bond gap is to be maintained. Curing of the two construction components is preceded by placement of a planar formation on at least one of the construction components. The planar formation may be a film and has passages or holes. A curable liquid is applied onto the planar formation having the passages, and the liquid penetrates into the passages of the planar formation. This curable liquid may come, for example, from a prepreg previously impregnated with resin, or may be introduced through an infusion method. After the liquid has been cured and the planar formation has been peeled away, structures made of cured liquid are left remaining on the construction component. These raised structures or pins serve as spacers when the construction component is being adhered to another construction component and can thus ensure a predetermined bond gap thickness. After the planar formation has been peeled off, an adhesive material may be applied, thus adhering the two construction components to one another.

The method according to the invention can be employed in the adhesion of construction components in manufacturing, installation, maintenance, repair, and the like and substantially reduces the burden of providing spacers. The method ensures that a predetermined bond gap thickness is reached, or that a minimum bond gap thickness is observed. It is possible to use conventional, unmodified tools. No additional auxiliary materials or distancing elements are needed during the adhesion process. Nor are other tools or corresponding set-up times required.

The method according to the invention is particularly suitable for the use of adhesives pastes, because the need for extremely complex positioning of conventional spacers is obviated with adhesive pastes. Moreover, the method according to the invention is very favorably compatible with modern methods of (pre)treating and manufacturing surfaces, such as plasma or laser methods.

Preferably, the planar formation having the curable or already cured liquid may remain on the first construction component until immediately before the adhesion to the second construction component or until immediately before a surface treatment, and thus act as a protective film, for example.

Preferably, a bonding gap minimum thickness can also be ensured.

The construction components are preferably composed of fiber composite materials, plastic, or the like.

The planar formation may be a film, a woven fabric, a weft-knitted fabric, a warp-knitted fabric, or the like. The planar formation can comprise fibers, preferably polymer fibers, and more preferably fluoropolymer fibers.

The curable liquid can be an epoxy resin, a plastic, or the like. The curable liquid can also be a curable foam.

The curing can take place based on the passage of time, on temperature, on exposure to gas, or the like.

The spacers can form a raised structure on the construction component to be adhered. The passages of the planar formation, which will form the spacers, can be variable as regards the shape, height, size, density, and/or distribution with respect to the planar formation thereof. For example, the cross-sections of the passages can be in the shape of a cross or circle, or oval, angular, linear, or star-shaped. The base and end surfaces of the passages or of the spacers that will be bordered by the two construction components to be adhered can have the same or different base surfaces. That is, the diameter or cross-section of one passage or spacer may taper or widen over the height thereof. The passage or spacer can therefore have the shape of a cone, a truncated cone, a double-cone, a pyramid, a screw, an hourglass, or the like. The shape of the spacer is defined by the shape of the passage in the planar formation. The passages can be distributed uniformly or gradually over the surface of the planar formation. The shape, height, size, density, and/or distribution thereof may likewise be uniform or vary over the surface of the planar formation. That is, the passages present in one part of the planar formation can have a different shape or distribution or be higher, larger, or greater in number than the passages present in another part of the planar formation.

The passages can be incorporated into the planar formation during the production of the planar formation, i.e., they can be released or re-woven, re-weft-knitted, or re-warp-knitted during weaving, weft-knitting, warp-knitting, or the like. The passages can also be punched, drilled, or injected, e.g., encapsulated by means of a laser, or the like, or they can simply be released when the planar formation is being produced.

The present invention further relates to a construction component having such a planar formation and passages.

Additional features, advantages, and possible applications of the present invention follow from the following description of the embodiments and the figures. All of the features that are described and/or visually depicted constitute the subject matter of the invention, independently and in any combination, in a manner irrespective of the composition thereof in the individual claims or references thereto. In the figures, like reference symbols refer to like or similar objects.

BRIEF DESCRIPTION OF THE DRAWING FIGURES

Exemplary embodiments of the invention will be elaborated below with reference to the accompanying drawings.

DETAILED DESCRIPTION

Figure 1:
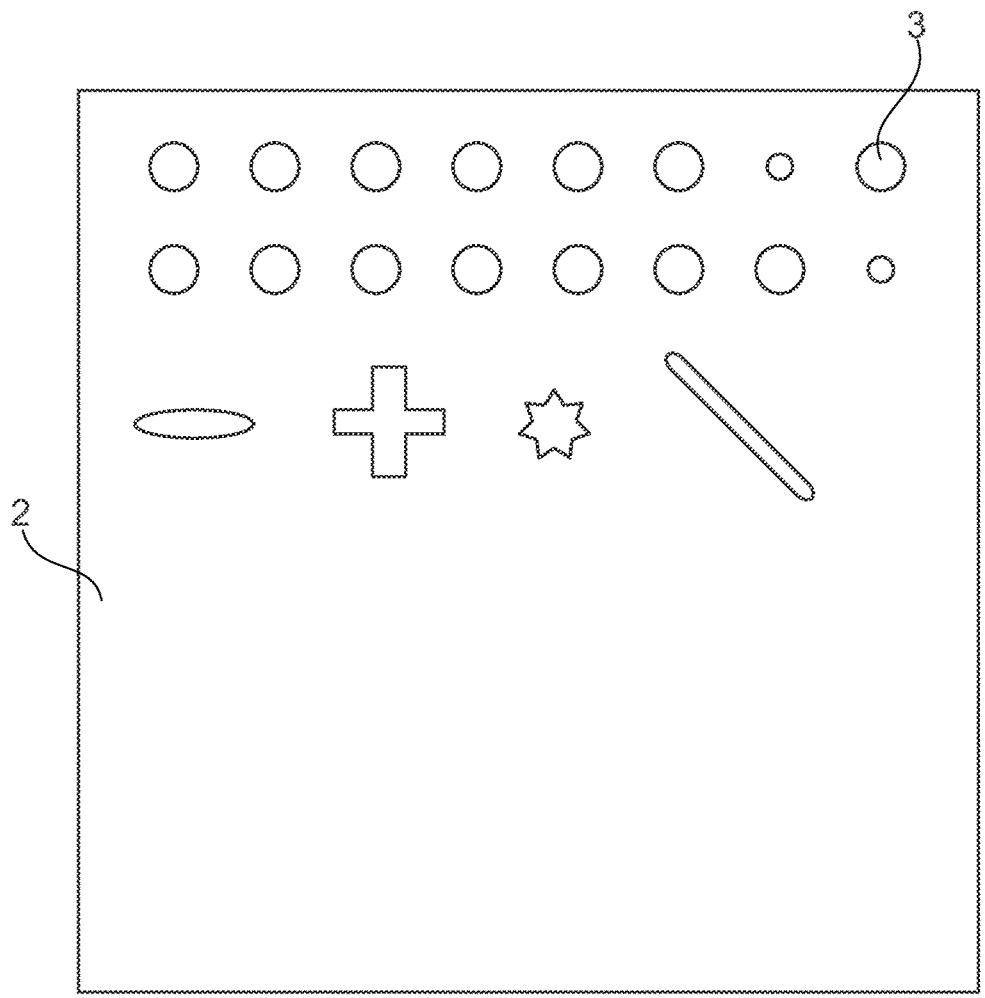
FIG. 1 shows a plan view of a planar formation in the form of a film, in a schematic representation.

FIG. 1 shows, in a schematic representation, a plan view of a planar formation 2 in the form of a film. By way of example, various forms of passages 3 or holes are illustrated, e.g., circular, oval, cross-shaped, star-shaped, or linear. The passages 3 have different sizes.

Figure 2:
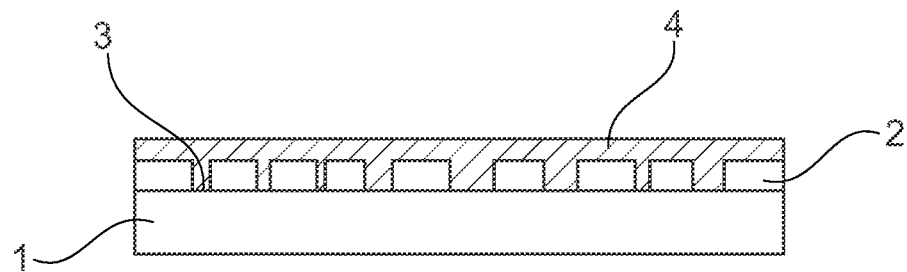
FIG. 2 shows a cross-section through a construction component on which a planar formation has been applied, in a schematic representation.

The planar formation 2 having the passages 3 is applied onto a construction component 1 to be adhered (see FIG. 2). The passages 3 are filled with a curable liquid 4 and the planar formation 2 is then pulled away from the construction component 1. The liquid 4, having solidified in the passages 3, is left alone on the construction component 1 in the form of pins, for example. When the construction component 1 is adhered to another construction component, these pins form spacers 5 (see FIG. 4) that ensure a predetermined bond gap thickness or that a predetermined minimum bond gap thickness is observed even in the event of local over-compression.

The passages 3 or subsequent spacers 5 may be uniform or vary over the surface of the planar formation 2 in terms of shape, height, size, density, and/or distribution. That is, different shapes and sizes of passages 3 may be arranged on the same planar formation 2. The density or manner of distribution thereof can vary or be uniform over the surface of the planar formation 2.

The thickness of the planar formation 2 can be between 0.001 and 10 mm, preferably between 0.01 and 1 mm, more preferably between 0.1 and 0.3 mm.

The planar formation 2 can be a film, a woven fabric, a knitted fabric, a warp-knitted fabric, or the like. The planar formation 2 can comprise fibers, preferably polymer fibers, and more preferably fluoropolymer fibers.

The diameter or cross-section of one passage 3 or hole may be between 0.1 and 5 mm, preferably between 0.2 and 3 mm, more preferably between 1 and 2 mm.

The curable liquid can be an epoxy resin, a plastic, or the like.

The construction components 1 to be adhered are preferably composed of fiber composite materials, plastic materials, or the like.

FIG. 2 shows, in a schematic representation, a cross-section through the construction component 1 on which a planar formation 2 has been applied. The planar formation 2 comprises passages 3 or holes. The passages 3 are non-uniformly distributed across the planar formation 2. The passages 3 vary in size or width.

The passages 3 are filled with a curable liquid 4 which usually sits flush with the planar formation 2, but here (for illustrative purposes) extends beyond the planar formation 2 and covers it.

The passages 3 can be incorporated into the planar formation 2 during the production of the planar formation 2, i.e., they can be released or woven, weft-knitted, or warp-knitted during the weaving, weft-knitting, warp-knitting, or the like. The passages 3 can also be punched, drilled, or injected, e.g. encapsulated by means of a laser, or the like, or they can simply be released when the planar formation 2 is being produced.

If the construction component 1 is be adhered to another construction component (not shown), then the other construction component can also have been provided in the same manner with the spacers 5. The spacers 5 can be aligned to one another or offset from one another during the adhesion.

The method according to the invention can be used in the adhering of construction components 1 in manufacturing, installation, maintenance, repair, and the like.

Figure 3:
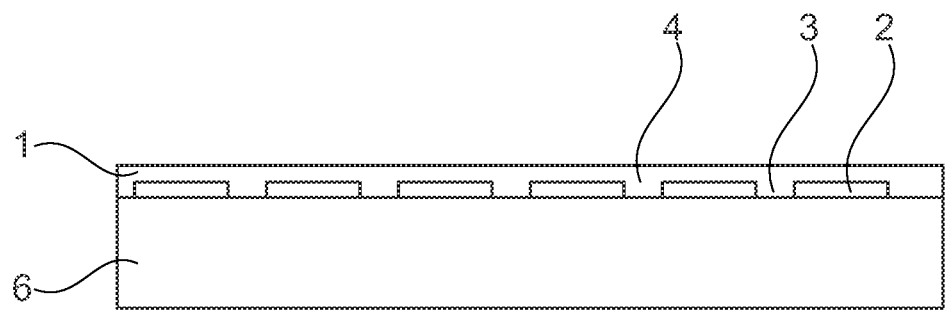
FIG. 3 shows a tool and a construction component with a planar formation in a schematic representation.

FIG. 3 shows, in a schematic representation, a tool 6 which defines a contour of the construction component 1 to be adhered. Though illustrated as straight here, the tool can also be curved or have some other shape. For example, the tool 6 can be molded from worn-out damage in a component of an aircraft. The construction component 1 to be adhered is applied onto the tool 6, e.g., in the form of a laminate with the planar formation 2, e.g., in the form of a release sheet, as well as the passages 3, thus transferring the contour thereof. The curable liquid 4 is poured into and solidified in the passages 3. The construction component 1 to be adhered having the planar formation 2 and the cured liquid 4 is removed from the tool 6, the planar formation 2 is pulled away, and the construction component 1 having the spacers 5 formed in this way from the cured liquid 4 (see FIG. 4) are adhered in place of the worn-out damage in the aircraft component.

Preferably, the planar formation 2 having the curable or already cured liquid 4 may remain on the first construction component 1 until immediately before the adhesion to the second construction component or until immediately before a surface treatment, thus acting as a protective film, for example.

Figure 4:
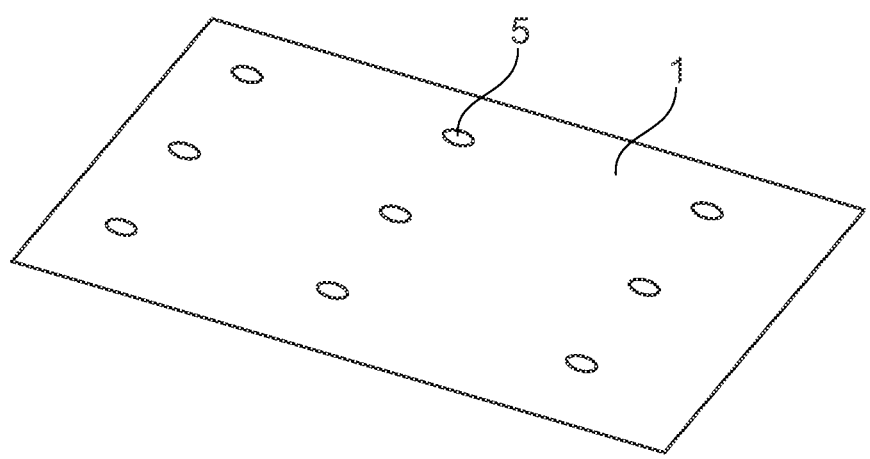
FIG. 4 shows a perspective view of the construction component to be adhered, with spacers, in a schematic representation.

FIG. 4 shows, in a schematic representation, the construction component 1 to be adhered, with spacers 5. Here, the spacers 5 have the form of knobs, are circular in shape, and are distributed uniformly in rows across the construction component. The knobs can ensure a predetermined bond gap thickness or minimum bond gap thickness.

Additionally, it should also be noted that the verb "comprising" does not preclude any other elements or steps, and that the use of the singular indefinite article or the number "one" does not preclude being a plurality. Furthermore, it should be noted that features or steps that have been described with reference to one of the above embodiments can also be used in combination other features or steps of other embodiments described above. Reference symbols in the claims shall not to be regarded as limiting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing spacers on a construction component to be adhered, the method comprising:
    placing a planar formation on the construction component to be adhered, wherein the planar formation comprises passages, wherein the planar formation comprises fibers, wherein the fibers are fluoropolymer fibers; and
    introducing a curable liquid into the passages of the planar formation so that the liquid forms spacers on the construction component to be adhered after curing and peeling off of the planar formation, the spacers ensuring a predetermined bond gap thickness.

2. The method of claim 1, further comprising peeling off the planar formation.

3. The method of claim 1, wherein the planar formation is a film, a woven fabric, a weft-knitted fabric, or a warp-knitted fabric.

4. The method of claim 1, wherein the spacers ensure a minimum bond gap thickness.

5. The method of claim 1, wherein the spacers form a raised structure on the construction component to be adhered.

6. The method of claim 1, wherein the passages in the planar formation are variable with respect to the shape, height, size, or distribution.

7. The method of claim 1, wherein the passages are
   in a shape of a circle, oval, or cross, or
   angular, linear, or star-shaped in cross-section.

8. The method of claim 1, wherein the passages are
   incorporated into the planar formation during the production of the planar formation, or
   introduced into the planar formation during a stamping process.

* * * * *